(12) United States Patent
Igi

(10) Patent No.: US 7,760,601 B2
(45) Date of Patent: Jul. 20, 2010

(54) REPRODUCING APPARATUS WITH BUILT-IN OPTICAL DISK DRIVE

(75) Inventor: Yasumasa Igi, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 471 days.

(21) Appl. No.: 11/982,779

(22) Filed: Nov. 5, 2007

(65) Prior Publication Data

US 2008/0109835 A1   May 8, 2008

(30) Foreign Application Priority Data

Nov. 6, 2006   (JP)   ............................. 2006-300676

(51) Int. Cl.
*G11B 27/36* (2006.01)
(52) U.S. Cl. ..................................... 369/53.2; 369/53.3
(58) Field of Classification Search ................ 369/53.2, 369/53.3, 53.43
See application file for complete search history.

(56) References Cited

U.S. PATENT DOCUMENTS

| | | | | |
|---|---|---|---|---|
| 4,653,040 A | * | 3/1987 | Senso | ........................ 369/239 |
| 5,644,561 A | * | 7/1997 | Son et al. | .................... 369/53.2 |
| 5,854,719 A | * | 12/1998 | Ginosar et al. | ................. 360/69 |
| 2004/0151096 A1 | * | 8/2004 | Yoo | .......................... 369/53.3 |
| 2007/0211587 A1 | * | 9/2007 | Kosaki | .................... 369/53.14 |

FOREIGN PATENT DOCUMENTS

| | | |
|---|---|---|
| JP | 62-83256 U | 5/1987 |
| JP | 2003-224988 | 8/2003 |
| JP | 2005-302242 | 10/2005 |

* cited by examiner

*Primary Examiner*—Thang V Tran
(74) *Attorney, Agent, or Firm*—Yokoi & Co., U.S.A., Inc.; Toshiyuki Yokoi

(57) ABSTRACT

Conventional reproducing apparatuses used to perform incorrect detection or consume electricity considerably. According to the present invention, the comparator 61 comparing voltages at both ends of the spindle motor 15 and outputting the result is provided, and the control IC 12 judges whether or not the spindle motor 15 is rotating based on the output from the comparator 61. Based on this judgment, brake pulses are repeatedly supplied to the spindle motor 15 until the spindle motor 15 stops. Based on the number of times the brake pulses are supplied until the spindle motor 15 stops, the presence or absence of an optical disk in the disk drive is determined.

12 Claims, 7 Drawing Sheets

REPRODUCING APPARATUS WITH BUILT-IN OPTICAL DISK DRIVE

CROSS-REFERENCES TO RELATED APPLICATIONS

The present application is related to the Japanese Patent Application No. 2006-300676, filed Nov. 6, 2006, the entire disclosure of which is expressly incorporated by reference herein.

BACKGROUND OF THE INVENTION

1. Field of the Invention

The present invention relates to a reproducing apparatus with a built-in optical disk drive.

2. Description of the Related Art

With regard to reproducing apparatuses for disk-shaped storage media such as an optical disk, there are following techniques known to judge whether or not a disk is mounted. That is, Japanese Patent Laid-open No. 2005-302242 (hereafter called "Patent document 1") discloses a technique to detect a counter-electromotive force of a spindle motor and to determine whether or not an optical disk is mounted based on the amount of change in the counter-electromotive force per unit time. Further, Japanese Utility Model Laid-open No. 62-83256 (hereafter called "Patent document 2") discloses a technique to determine the presence or absence of a disk based on whether or not data are being read from the disk and based on an electric current flowing through a drive motor for rotating the disk and a signal indicating that a tray on which the disk is mounted is closed. Still further, Japanese Patent Laid-open No. 2003-224988 (hereafter called "Patent document 3") discloses a technique to utilize a counter-electromotive force found by voltages at both ends of the spindle motor to learn its rotation rate and the direction in which the motor is rotated.

However, in general, since disks vary in weight and shape, there are caused track eccentricity and wobble of the disk surface, and also unevenness in the counter-electromotive force. That is, as described in Patent document 1, when detecting the presence or absence of the disk by the amount of change in the counter-electromotive force per unit time, incorrect detection was very likely to take place. Further, in Patent document 2, one end of the motor for driving the disk to rotate is grounded through a resistor, and the voltage based on the electric current which flows through the motor for driving the disk to rotate is monitored. Therefore, electric power supplied to the motor was consumed by the resistor.

BRIEF SUMMARY OF THE INVENTION

The present invention is made in view of the above, and it offers a reproducing apparatus with a built-in optical disk drive which can detect the presence or absence of a disk with low electric power and without incorrect detection.

According to the present invention, there is provided a reproducing apparatus with a built-in optical disk drive including a spindle motor to rotate an optical disk, an optical pickup to emit a laser beam for reproducing information recorded on the optical disk and to receive a reflected light from the optical disk, the reproducing apparatus comprising: a comparator that compares voltages at both ends of the spindle motor and outputs the result; a rotation detector that judges whether or not the spindle motor is rotating based on an output from the comparator; a braking circuit that repeatedly supplies brake pulses, based on the judgment of the rotation detector, to the spindle motor until the spindle motor stops; a memory that stores the number of times the brake pulses are supplied until the spindle motor stops; and an optical disk presence-or-absence determining unit that determines the presence or absence of the optical disk based on the number of times stored in the memory. According to the above construction, the comparator compares the voltages at both ends of the spindle motor and outputs the result, the rotation detector judges whether or not the spindle motor is rotating based on the output by the comparator, the braking circuit repeatedly supplies brake pulses to the spindle motor until it stops based on the judgment by the rotation detector, the memory stores the number of times the brake pulses are supplied until the spindle motor stops, and the optical disk presence-or-absence determining unit determines the presence or absence of the optical disk based on the numbers of times stored in the memory. Thus, the presence or absence of the disk is determined by the number of times the brake pulses are supplied until the spindle motor stops so that the presence or absence of the disk can be determined without being affected by the error due to structural design of the disk.

According to another optional aspect of the present invention, the braking circuit may be constructed such that, after the rotation rate of the spindle motor is increased to a predetermined rotation rate, it supplies brake pulses to the spindle motor until it stops. With the above construction, the number of times the brake pulses are supplied until the spindle motor stops reflects the presence or absence of the disk more effectively.

According to another optional aspect of the present invention, the braking circuit may once stop the rotation of the spindle motor before the rotation rate of the spindle motor is increased. If the rotation of the spindle motor is stopped and then the rotation rate of the spindle motor is increased, the time for applying voltages to increase the rotation rate of the spindle motor to the predetermined rotation rate can be fixed. Therefore, the rotation rate of the spindle motor can be controlled more easily.

According to another optional aspect of the present invention, the braking circuit may be constructed such that, after the rotation rate of the spindle motor is increased to the predetermined rotation rate, the braking circuit may wait a predetermined time and then supply the brake pulses. By waiting the predetermined time, the output to the spindle motor is not distorted. Further, the amount of rotational energy of the spindle motor (including an optical disk if it is mounted) reduced by one brake pulse tends to have less variation.

According to another optional aspect of the present invention, the optical disk presence-or-absence determining unit may determine that the optical disk is not mounted when the number of times the brake pulse is supplied is less than a first prescribed number of times. Further, the optical disk presence-or-absence determining unit may determine that the optical disk is mounted when the number of times the brake pulses are supplied is equal to or more than the first prescribed number of times. The rotational energy is smaller when the optical disk is mounted than when the optical disk is not mounted. Therefore, when the number of times is equal to or more than the first prescribed number of times, the rotational energy is high and the optical disk is mounted. Alternatively, when the number of times is less than the first prescribed number of times, the rotational energy is low and the optical disk is not mounted. Thus, the presence or absence of the optical disk can be determined by the number of times the brake pulses are supplied.

The optical disk presence-or-absence determining unit has the first prescribed number of times and a second prescribed number of times which is larger than the first prescribed number of times. When the number of times the brake pulses are supplied is larger than the second prescribed number of times, the optical disk presence-or-absence determining unit may determine that the spindle motor is out of working order. The weight of the optical disk should be within a predetermined tolerance, and the weight is in proportion to the rotational energy. Therefore, when the amount of rotational energy reduced by brake pulses greatly exceeds the predetermined tolerance, the spindle motor may be out of working order. Thus, not only the presence or absence of the disk but also the irregularity in the spindle motor can be determined.

The comparator outputs LOW ("Low") when a voltage to rotate the spindle motor in the direction of reading of the disk, and outputs HIGH ("High") when a voltage of the brake pulse for the spindle motor is inputted. Further, when the input of the voltage is stopped, the comparator keeps outputting at the same level as the one immediately before the suspension for a predetermined time and then outputs LOW ("Low.") Further, the rotation detector may judge that the spindle motor has stopped when it detects HIGH ("High") in a predetermined time after the brake pulse is inputted by the braking circuit. Thus, if the construction is such that the comparator keeps outputting HIGH ("High") for a predetermined time after the brake pulse has been inputted, the state of the spindle motor not rotating can be detected more easily.

Specifically, there may be provided a reproducing apparatus with a built-in optical disk drive including a spindle motor adapted to rotate an optical disk and an optical pickup adapted to emit a laser beam for reproducing information recorded on the optical disk and to receive a light reflected from the optical disk, the reproducing apparatus comprising: a driver which outputs a drive voltage to the spindle motor; a comparator which compares voltages produced at both terminals of the spindle motor, outputs LOW ("Low") when a voltage to rotate the spindle motor in a direction of reading the disk is inputted, outputs HIGH ("High") when a voltage of the spindle-motor brake pulse is inputted to the spindle motor, keeps outputting at the same level as the one immediately before a suspension when the input of the voltage is suspended for a predetermined time, and then outputs LOW ("Low,"); and a control IC including a counter which outputs a control signal to control the output of the drive voltage of the driver while receiving the output from the comparator at a general purpose input output (GPIO) and outputs a voltage to be a base of the drive voltage to the driver. The control IC stops the spindle motor by controlling the driver, resets the counter, and waits a predetermined time after controlling the driver and rotating the spindle motor at a predetermined rotation rate in a positive direction. Further, the control IC repeatedly supplies brake pulses to the spindle motor until the spindle motor stops, counts the number of times the brake pulses are supplied with the counter, determines that the spindle motor has stopped when detecting HIGH ("High") in a predetermined time after the brake pulses are inputted. While the spindle motor is stopped, the control IC determines that an optical disk is not mounted when the value of the counter is smaller than a threshold value, determines that the optical disk is mounted when the value of the counter is equal to or larger than the threshold value and smaller than a predetermined upper-limit number of times, and determines that the spindle is out of working order when the value of the counter is equal to or larger than the predetermined upper-limit number of times.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Now, the embodiment of the present invention will be described in the following order.

(1) Construction of reproducing apparatus with built-in optical disk drive
(2) Determination of presence-or-absence of disk
(3) Summary (1) Construction of Reproducing Apparatus with Built-in Optical Disk Drive Referring to FIGS. 1 to 4, the reproducing apparatus with a built-in optical disk drive according to the embodiment of the present invention will be described. In the present embodiments, the reproducing apparatus with a built-in optical disk will be explained as an example. However, the reproducing apparatus may have a function for recording data on the optical disk. Also, in addition to a DVD reproducing function, the reproducing apparatus may be a combo-type reproducing apparatus having HDD (Hard Disk Drive) reproducing and recording functions, reproducing and recording functions for reel tapes such as of VHS, Beta, etc. The optical disk drive of the present invention may be an optical disk drive of a slot-in type which does not have a disk tray. However, an optical disk drive of disk-tray type equipped with a disk tray is suitable for applying the present invention, because whether or not a disk is mounted is not known when loading a disk onto the disk tray.

Figure 1:
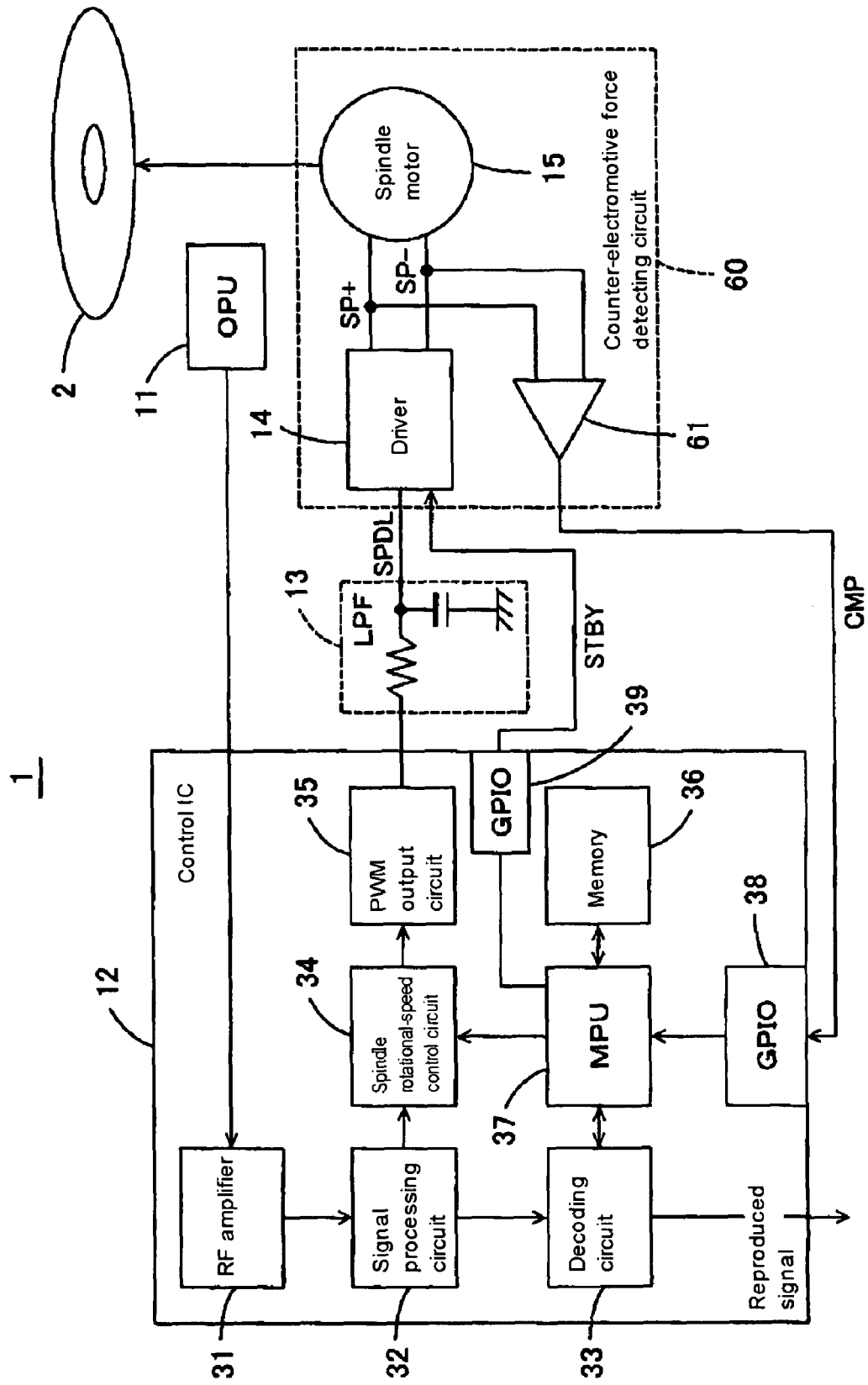
FIG. 1 is an exemplary illustration of a block diagram showing a reproducing apparatus with a built-in optical disk drive.

FIG. 1 is a block diagram showing a reproducing apparatus with a built-in optical disk drive. As shown in FIG. 1, the optical disk unit 1 is a device which performs reproduction etc. of information recorded on an optical disk 2, such as a DVD. The optical disk unit 1 comprises an optical pickup (OPU) 11, a control IC 12 which controls reproduction of information recorded on the optical disk, a low pass filter 13, a driver 14 which drives a spindle motor 15 based on spindle output from the control IC 12, the spindle motor 15 which rotates the optical disk 2, and a counter-electromotive force detecting circuit 60 which detects voltages produced at terminals of the spindle motor 15.

The optical pickup 11 comprises a semiconductor laser, a collimator lens, a beam splitter, an objective lens, a condensing lens, a photodetector, etc. The laser beam emitted from the semiconductor laser is collected and applied to a recording surface of the optical disk 2 through the collimator lens, beam splitter, and objective lens. The reflected light is received by the photodetector through the objective lens, beam splitter, and condensing lens. The intensity of the light detected by the photodetector is converted to an RF signal and is outputted to the control IC 12.

The control IC 12 comprises an RF amplifier 31 which amplifies the RF signal, a signal processing circuit 32 which converts the RF signal into a digital signal and performs $8/16$ demodulation, error correction, etc., a decoding circuit 33 which decodes the digital signal inputted from the signal processing circuit 32 and obtains a reproduced signal, a spindle rotational-speed control circuit 34 which is for controlling the rotational speed of the spindle motor 15, a PWM output circuit 35 which sends a spindle output to the spindle motor 15 for performing PWM (Pulse Width Modulation) control over the spindle motor 15, a memory 36 which stores various pieces of information, an MPU 37 which controls the entire control IC 12 and controls reproduction etc. of the information from the optical disk 2, and a GPIO 38 which outputs the inputted analog signal to the MPU 37.

Figure 2:
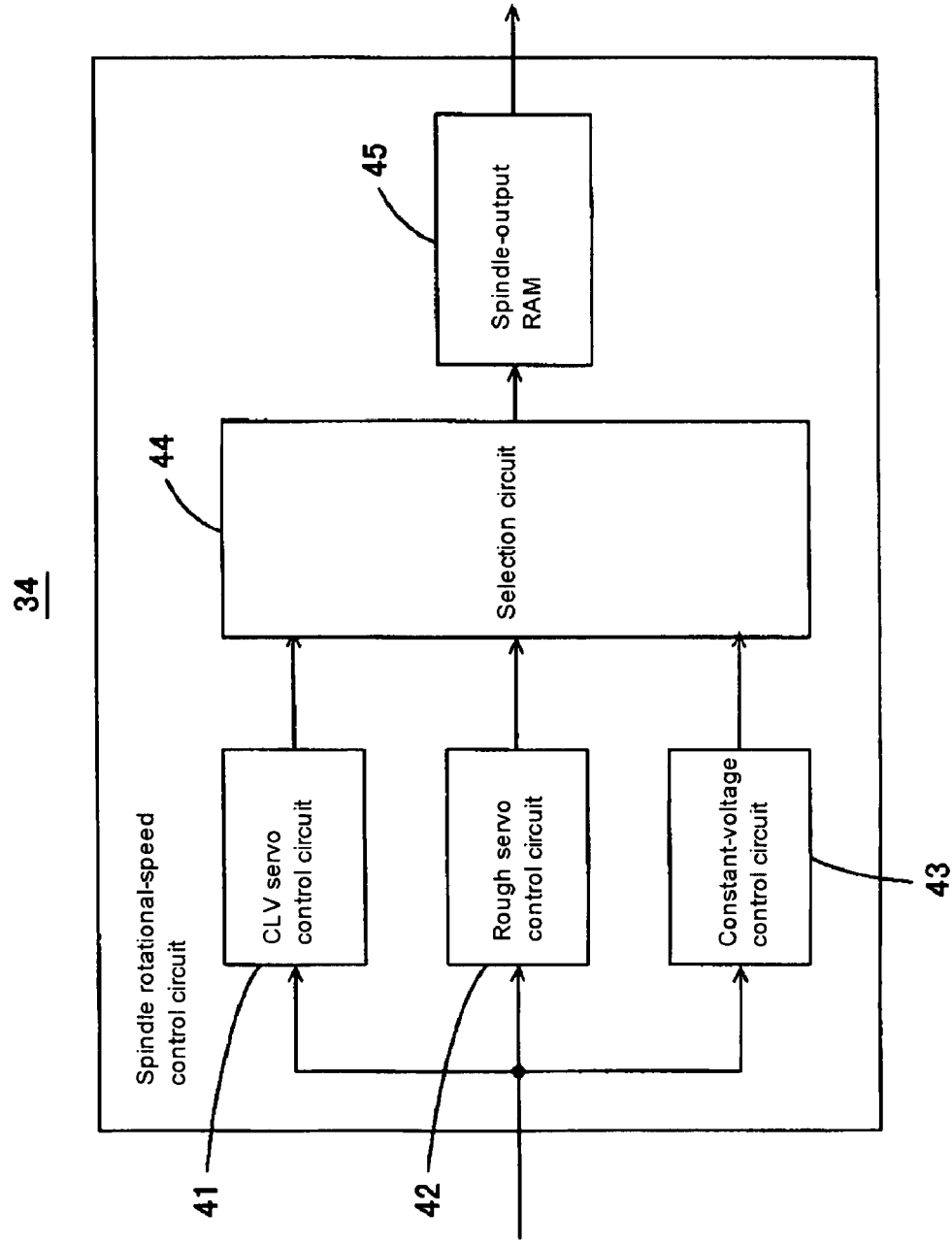
FIG. 2 is an exemplary illustration of a block diagram showing a construction of a spindle rotational-speed control circuit of an optical disk unit.
Figure 3:
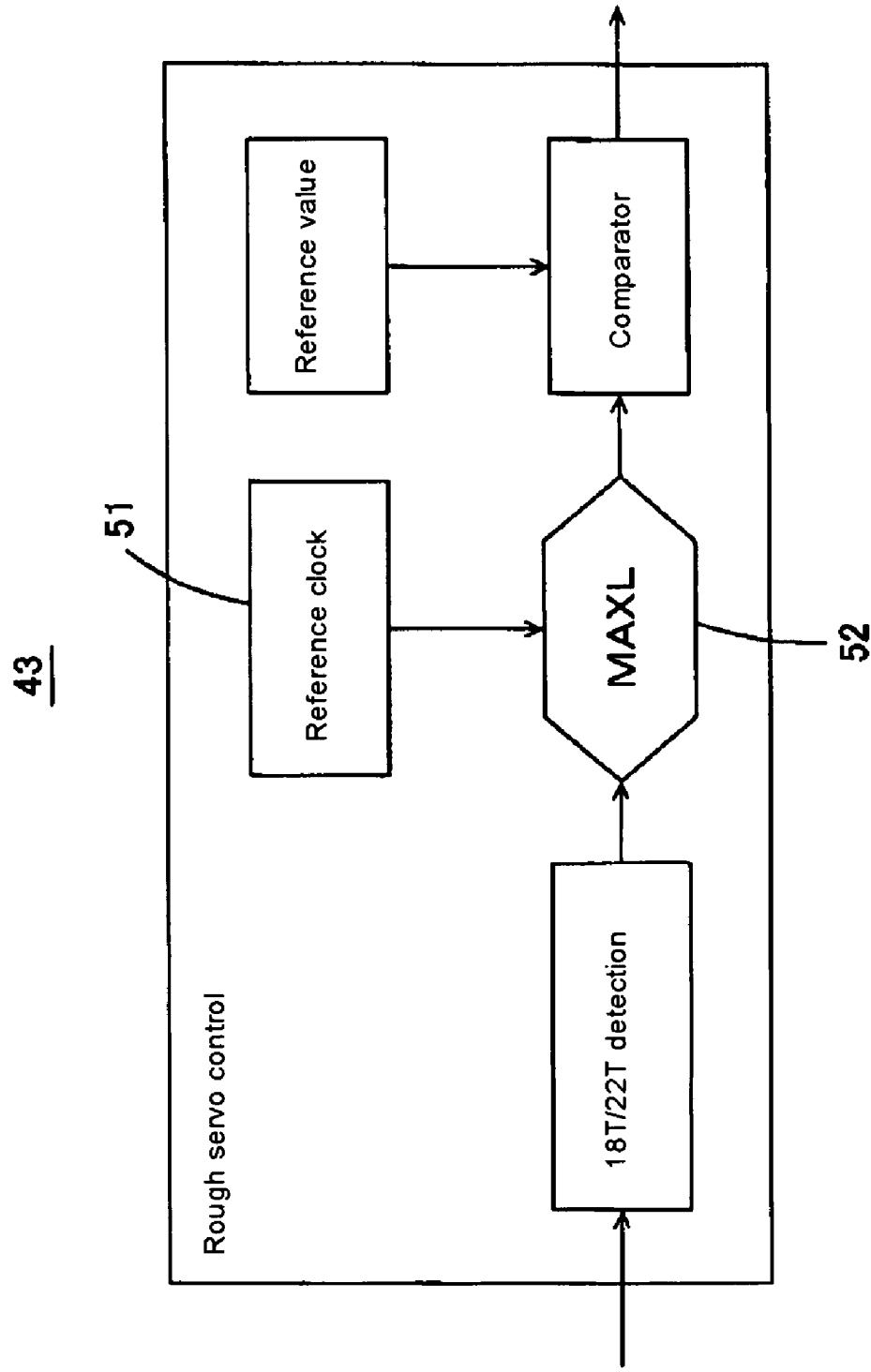
FIG. 3 is an exemplary illustration of a block diagram showing a construction of a rough servo control circuit of the spindle rotational-speed control circuit.

As shown in FIG. 2, the spindle rotational-speed control circuit 34 comprises a CLV servo control circuit 41 which outputs a CLV (Constant Linear Velocity) control signal to the PWM output circuit 35 and performs CLV control over the spindle motor 15, a constant-voltage control circuit 43 which outputs a constant-voltage control signal to the PWM output circuit 35 and performs constant-voltage control over the spindle motor 15, a rough servo control circuit 42 which controls the rotational speed based on a reference clock (see FIG. 3), a selection circuit 44 which chooses one of the control circuits 41 to 43 and outputs a control signal to the PWM output circuit 35, and a RAM (Random Access Memory) for spindle output 45 which stores control values of the control signals from the control circuits 41 to 43.

The spindle motor 15 comprises a DC motor which has brushes. The rotational speed of the spindle motor 15 is detected by an MAXL 52 based on a reference clock 51 of the rough servo control circuit 42. The MAXL 52 is a portion which, for instance, detects the longest sync pattern of 14T+4T length in the case of DVDs and of 11T+11T length in the case of CDs by 18T/22T detection, and holds data which are counted by the reference clock 51 with respect to these sync patterns of the longest length, and the rotational speed of the spindle motor 15 is detected based on such data.

The counter-electromotive force detecting circuit 60 comprises a comparator 61, the driver 14, the spindle motor 15, etc. Of the two terminals to which drive voltages for the spindle motor 15 are inputted, the voltage of the terminal to which a positive voltage is inputted is referred to as SP+ (Positive-side terminal voltage). Also, the voltage of the terminal to which a negative voltage is inputted is referred to as SP− (Negative-side terminal voltage). Then, SP+ and SP− are inputted to the comparator 61 and compared. The output CMP of the comparator 61 is set such that the output is "Low (LOW)" when (SP+)−(SP−) is positive, and "High (HIGH)" is outputted when (SP+)−(SP−) is negative. In the following description, the rotational direction of the spindle motor 15 when (SP+)−(SP−) is positive is referred to as a positive direction.

The output CMP from the comparator 61 is inputted to the GPIO 38 of the control IC 12. The MPU 37 obtains the output CMP through the GPIO 38, and judges whether or not the spindle motor 15 is rotating based on the output CMP. That is, when a brake pulse (spindle-motor brake pulse) is applied to the spindle motor 15, (SP+)−(SP−) becomes negative and the output CMP turns "H." In this regard, if the output CMP turns "L" after the brake pulse has been applied, the spindle motor 15 is rotating. Alternatively, if the output CMP remains "H" after the brake pulse (has been) is applied, the spindle motor 15 is not rotating. Further, since the control IC 12 repeatedly supplies brake pulses until the spindle motor 15 stops, it constitutes a braking circuit.

Thus, the comparator 61 compares voltages produced at both ends of the spindle motor 15. When the voltage to rotate the spindle motor 15 in the direction of reading the disk is inputted, the comparator 61 outputs "Low." When the voltage of the spindle-motor brake pulse is inputted to the spindle motor, the comparator 61 outputs "High." Further, when the input of the voltage is suspended, the comparator keeps outputting at the same level as the one immediately before the suspension for a predetermined time and then outputs "Low."

Figure 4:
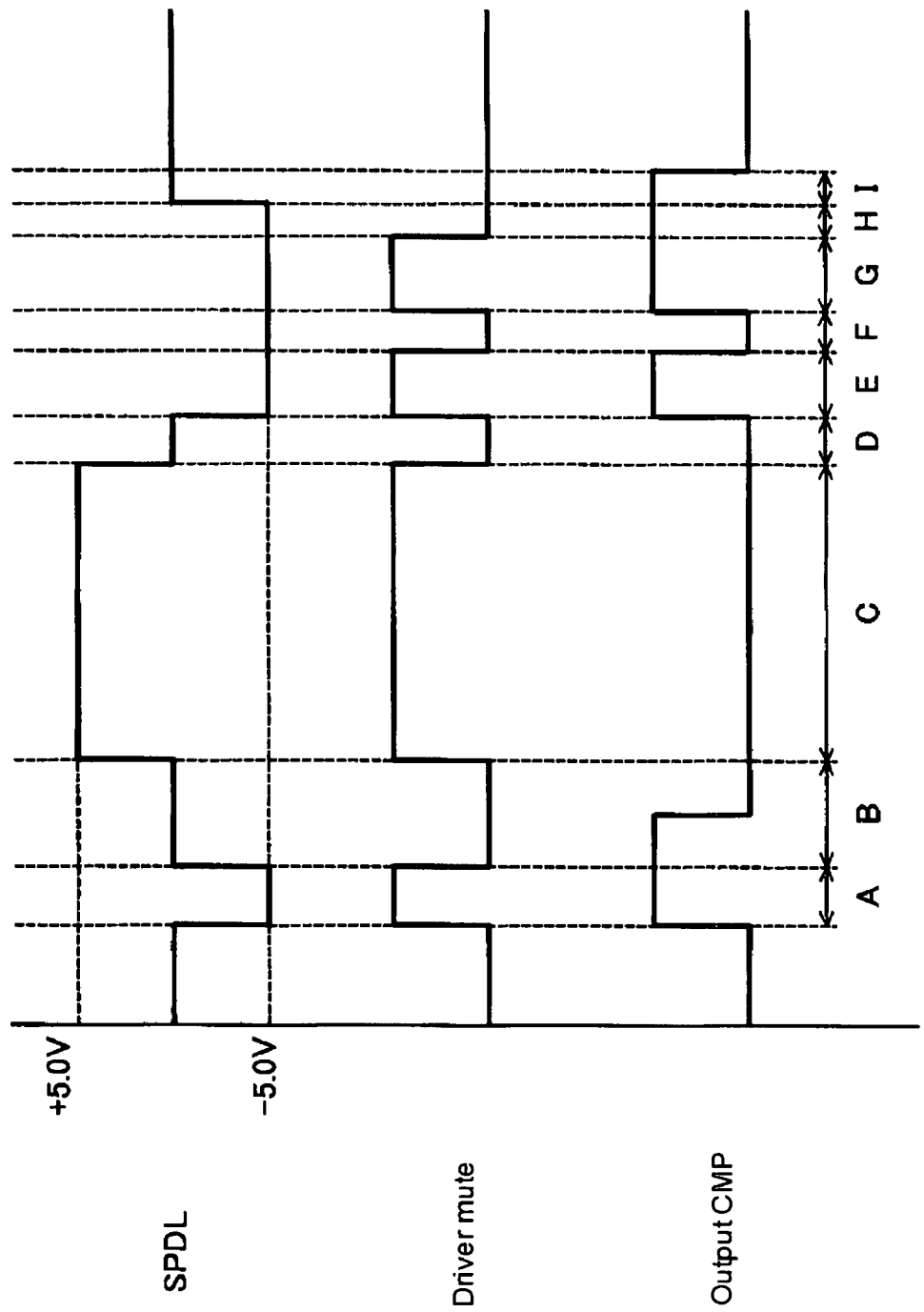
FIG. 4 is an exemplary illustration of a timing chart which shows a voltage SPDL, a DM signal STBY, and an output CMP.

FIG. 4 is a timing chart which shows a voltage SPDL supplied to the driver 14 from the control IC 12, a driver mute (DM) signal STBY which turns on and off the driver, and the output CMP from the comparator 61. The driver 14 drives the spindle motor 15 by supplying a drive voltage based on the SPDL to the spindle motor 15. The SPDL represents a voltage signal immediately before the driver 14. When the DM signal STBY is "High (HIGH)," the driver 14 supplies an SPDL to the spindle motor 15. Alternatively, when the DM signal is "Low (LOW)," the driver 14 does not supply an SPDL to the spindle motor 15.

In FIG. 4, the control IC 12 turns the DM signal STBY "H," and allows the driver 14 to output a drive voltage. At the same time, the control IC 12 supplies −5V as an SPDL to the driver 14 until the disk stops, that is, until the rotation of the spindle motor 15 stops. Since (SP+)−(SP−) of the spindle motor 15 becomes negative, the output CMP becomes positive (Period A in FIG. 4). Whether or not the spindle motor 15 is stopped can be judged, for instance, by zero crossing of the (SP+)−(SP−).

In a period B after the period A, the SPDL is 0V and the DM signal STBY turns "L." Moreover, since the spindle motor 15 is stopped, (SP+)−(SP−) is 0 and, as for the output CMP, "H" may be outputted or "L" may be outputted. In the present embodiment, the output CMP is maintained only for a predetermined time (6 to 4 ms) at "H" (keeps outputting at "H") when (SP+)−(SP−) turns 0 from negative, and turns "L" after the predetermined time.

A period C after the period B is for rotating the spindle motor 15 at a constant rotational speed. In the period B, the DM signal STBY first turns "H." Subsequently, +5V is supplied only for 500 ms as an SPDL, and then the DM signal STBY turns "L" after the 500 ms. Since (SP+)−(SP−) is positive at this time, the output CMP is maintained at "L."

In a period D after the period C, the SPDL is 0V and the DM signal STBY is "L."

A period E after the period D is for supplying brake pulses to the spindle motor 15, and −5V is applied to the spindle motor 15 for 50 ms. Specifically, first, the DM signal STBY turns "H." Then, −5V is supplied only for 50 ms as an SPDL, and the DM signal STBY turns "L" after the 50 ms. Since (SP+)−(SP−) is negative at this time, the output CMP turns "H."

A period F after the period E is a waiting period for judging whether or not the spindle motor 15 is stopped, and is 10 ms in the present embodiment. Specifically, although the SPDL is maintained at −5V, since the DM signal STBY is "L," a drive voltage is not supplied to the spindle motor 15 from the driver 14. Therefore, (SP+)−(SP−) becomes equal to an electromotive force which is produced by the spindle motor 15 rotating by inertia. That is, when the rotation of the spindle motor 15 is not stopped, the spindle motor 15 is rotating in the positive direction and the output CMP is "L." If the rotation of the spindle motor 15 is stopped, (SP+)−(SP−) becomes 0 and the output CMP turns "L" after being kept "H" for a predetermined period. In the period F, the rotation of the spindle motor 15 is not stopped, and the output CMP is "L."

A period G after the period F is, like the period E, for supplying brake pulses to the spindle motor 15, and −5V is applied to the spindle motor 15 for 50 ms. Specifically, first, the DM signal STBY turns "H," −5V is applied as an SPDL for 50 ms, and the DM signal STBY turns "L" after the 50 ms. Since (SP+)−(SP−) is negative at this time, the output CMP turns "H."

A period H after the period G is, like the period F, a waiting period for judging whether or not the spindle motor 15 is stopped. In the present embodiment, the period H is 10 ms. Specifically, although the SPDL is maintained at −5V, the DM signal STBY is "L." Therefore, a drive voltage is not supplied from the driver 14 to the spindle motor 15. In the period H, since the rotation of the spindle motor 15 is stopped, the output CMP is maintained at "H." When the rotation of the spindle motor 15 is stopped, the SPDL being supplied to the driver 14 is stopped and turns 0V. In a period 1, after the predetermined time, the output CMP turns from "H" to "L."

Thus, by generating the output CMP from SP+ and SP− of the spindle motor 15 by the comparator, it becomes possible for the GPIO of the control IC to determine whether the spindle motor is rotating or stopped. Therefore, an expensive A/D converter is not necessary and cost reduction can be achieved. Further, as the comparator, if the one being used for differentials is utilized, additional cost is not necessary and, further, cost reduction can be achieved.

(2) Determination of Presence-or-absence of Disk

Figure 5:
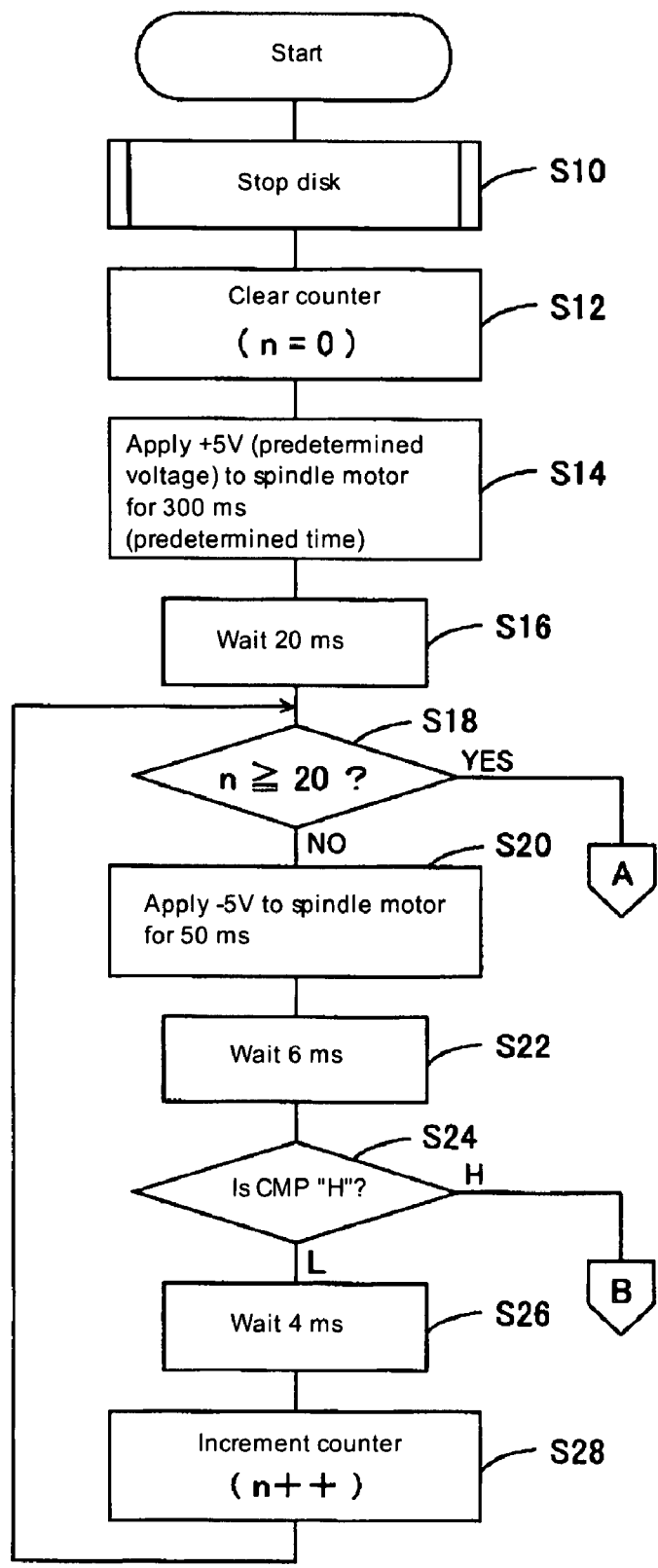
FIG. 5 is an exemplary illustration of a flowchart which shows processing by an MPU.
Figure 6:
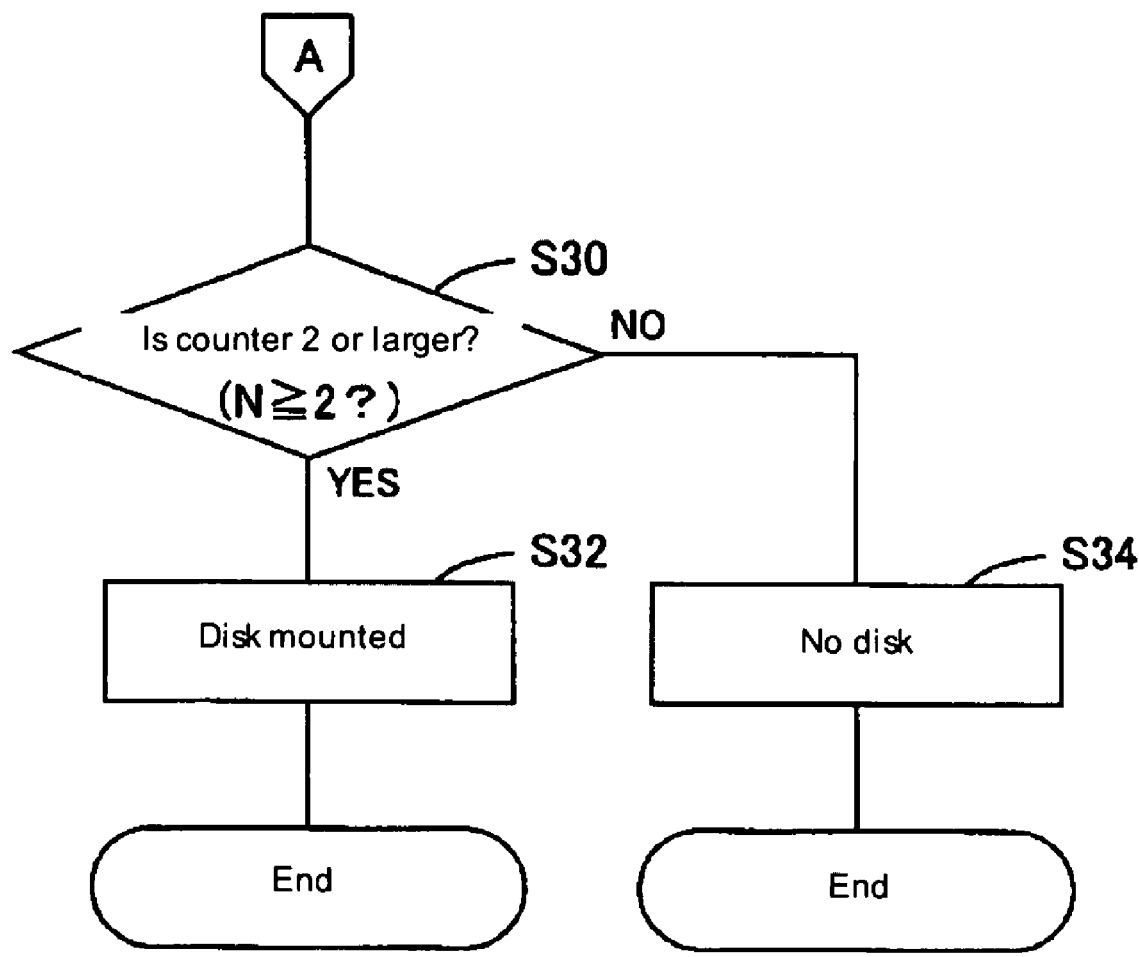
FIG. 6 is an exemplary illustration of a flowchart which shows processing by the MPU.
Figure 7:
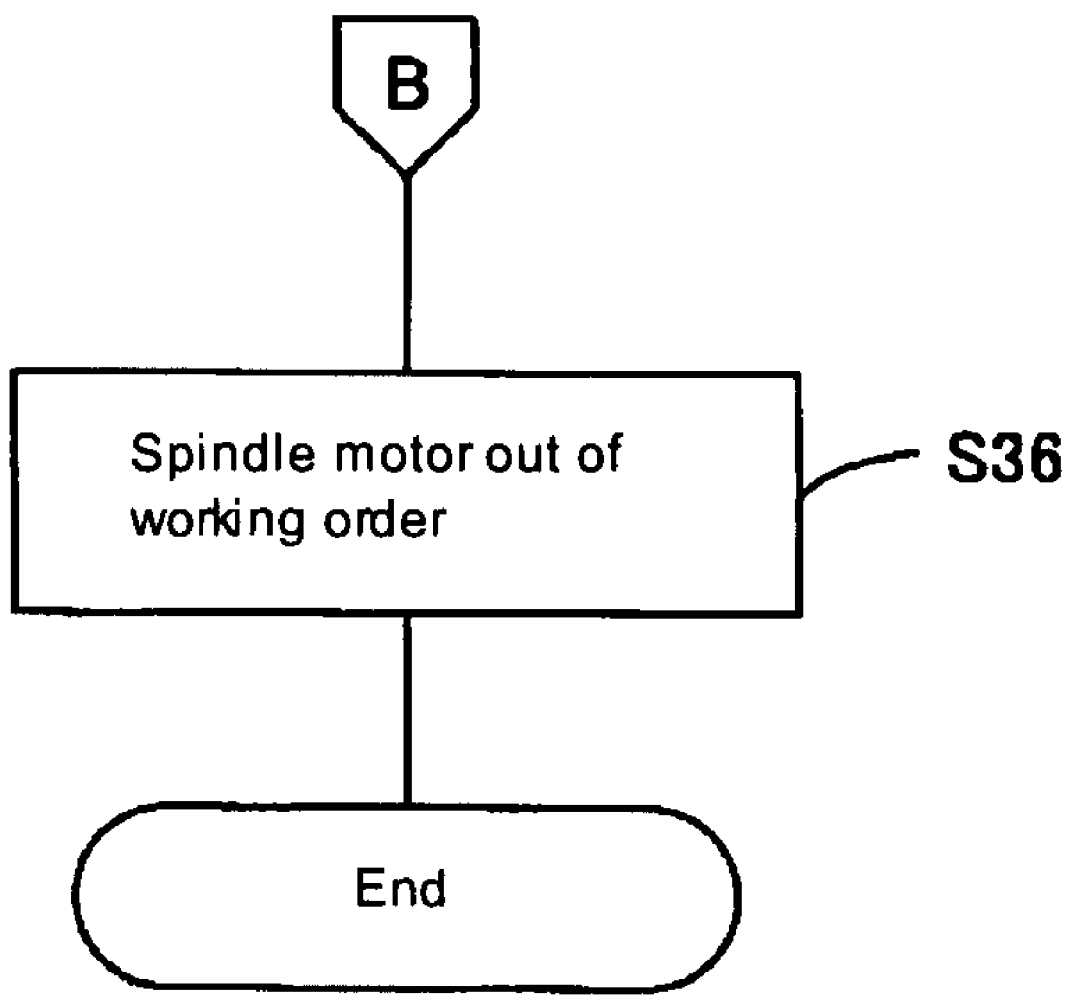
FIG. 7 is an exemplary illustration of a flowchart which shows processing by the MPU.

With reference to FIGS. 5 to 7, processing by the MPU 37 to determine the presence or absence of the disk in the disk drive will be explained. FIGS. 5 to 7 are flowcharts showing the processing by the MPU 37. This processing is performed when it is necessary to check the presence or absence of the optical disk in the disk drive such as the cases when an ejected disk try is loaded, when the reproduction of the optical disk is requested, when the power is turned on, etc.

When the processing is started, in step S10, the disk is stopped. This process corresponds to the period A in the timing chart of FIG. 4. While a DM signal STBY being "H" and a drive voltage based on SPDL being outputted to the spindle motor 15, the PWM output circuit 35 outputs −5V as an SPDL. After the spindle motor 15 has been stopped, the DM signal is turned "L," and the drive voltage based on the SPDL is not allowed to be outputted to the spindle motor 15. At the same time, the PWM output circuit 35 is made to stop supplying the SPDL.

In step S12, the counter n is cleared (reset) (n=0). The counter n is the one to count the number of times the brake pulses are supplied.

In step S14, the spindle motor 15 is rotated in the positive direction for a fixed period so that the rotation rate of the spindle motor 15 may be increased to a predetermined rotation rate. This process corresponds to the period C in the timing chart of FIG. 4. Specifically, while keeping the DM signal STBY at "H" and applying +5V as an SPDL for 300 ms, the DM signal STBY is turned "L" and the driver output is stopped. As a result, the spindle motor 15 rotates in the positive direction at a constant speed. Since a brake pulse is applied after turning the rotational speed constant in step S14, the number of times the brake pulses are supplied until the spindle motor 15 stops more effectively reflects the presence or absence of the disk. Needless to say, if it is a disk drive which rotates the spindle motor 15 at a constant speed and starts reading information from an optical disk when the disk is loaded, the present step can be omitted.

In step S16, the process is suspended for a predetermined time so that the output to the spindle motor 15 may not be distorted. This process corresponds to the period D in the timing chart of FIG. 4. Specifically, after turning the DM signal STBY "L," the process is suspended for 20 ms. That is, when the brake pulse which is a drive voltage in a direction of opposite rotation is applied successively to the output of the drive voltage of the spindle motor 15 in the positive direction of step S14, there is a possibility that the drive voltage to the spindle motor 15 will be distorted. That is, the number of times the brake pulses are supplied until the spindle motor 15 stops more effectively reflects the presence or absence of the disk by waiting the predetermined time.

In step S18, it is judged whether or not the counter n is equal to or more than the predetermined upper limit number of times. Specifically, it is judged whether or not the counter n is equal to 20 or larger (prescribed number of times or larger). If the counter is equal to 20 or larger, the condition is met and the process advances to step 36 in FIG. 7. Then, it is judged that the spindle motor 15 is out of working order and the process is ended. This "n=20" constitutes a second prescribed number of times. Further, as is described later, in the present embodiment, there are provided the first prescribed number of times and the second prescribed number of times which is larger than the first number of times. When the number of times the brake pulses are supplied is larger than the second prescribed number of times, it is determined that the spindle motor is out of working order.

When the step S36 is completed, the MPU 37 performs processing to inform a user of the irregular state of the spindle motor 15 such as by allowing a display section (not shown) to display information indicating the irregular state of the spindle motor 15, allowing an OSD (On Screen Display) processor etc. to generate an OSD signal showing the irregular state of the spindle motor 15 and outputting it to the decoding circuit 33 for an image signal to be shown as an OSD display etc. On the other hand, if the counter n is smaller than 20, the condition is not met, and the process advances to step S20.

In step S20, brake pulses are applied to the spindle motor 15 for a predetermined time. This process corresponds to the period E or the period G in FIG. 4. FIG. 4 shows an example where step S20 is repeated twice and the process is ended. Specifically, while keeping the DM signal STBY at "H," −5V as an SPDL is applied for 50 ms. Then, the DM signal STBY is turned "L" and the driver output is stopped. That is, by applying, for a predetermined time, a voltage which rotates the spindle motor 15 in an opposite direction, predetermined rotational energy is deprived of the spindle motor 15 (including an optical disk if it is mounted).

In step S22, a brake pulse is applied and then the process is suspended for a predetermined time. Specifically, the process is suspended for 6 ms after the DM signal has turned "L." Then, it is judged whether or not the output CMP is "H." If the output CMP is "H," the condition is met and the process advances to step S30 in FIG. 6. If the output CMP is "L," the condition is not met and the process advances to step S26. In step S26, the process is further suspended for 4 ms and then advances to step S28. The process to advance to step S28 after undergoing steps S22, S24, and S26 corresponds to the period F in the timing chart of FIG. 4. Also, the process to advance to step S30 after undergoing steps S22 and S24 corresponds to the period H in the timing chart of FIG. 4.

In step S28, the counter n is incremented and the processes from step S18 are repeated.

In step S30, it is judged whether or not the counter n has a threshold value with which the presence or absence of the disk is determined. Specifically, it is judged whether or not the counter n is equal to 2 or larger. This "n=2" constitutes the first prescribed number of times. If the counter is equal to 2 or larger (prescribed number of times or larger), the condition is met and the process advances to step S32. The presence of the disk is confirmed and the process is ended. When step S32 is completed, the MPU 37 controls sections of the spindle rotational-speed control circuit 34, decoding circuit 33, etc. and allows them to read and reproduce information recoded on the optical disk. On the other hand, if the value of the counter is smaller than 2, the condition is not met, and the process advances to step S34. The absence of the disk is confirmed and the process is ended. When step S34 is completed, the MPU 37 performs processing to inform the user of the absence of the disk such as allowing a display section (not shown) to display information indicating the absence of the disk, allowing the OSD (On Screen Display) processor etc. to generate an OSD signal showing the absence of the disk and outputting it to the decoding circuit 33 for an image signal to be shown as an OSD display etc.

The MPU 37 or the control IC 12 which performs the processing in steps S18 to S28 constitutes the control circuit. The MPU 37 or the control IC 12 which allows the memory 36 to store the count of the counter constitutes the memory. The MPU 37 or control IC 12 which performs the processing in step S24 constitutes the rotation detector. Further, the MPU 37 or control IC 12 which performs the processing in steps S18 and S30 constitutes the optical disk presence-or-absence determining unit.

Now, workings of the present embodiment constructed as above will be described. When a user loads a disk tray into the disk drive, a process is started to judge whether or not an optical disk is mounted on the disk tray. First, the rotation of the optical disk is stopped (step S10). Then, +5V is applied to the spindle motor 15 through the driver 14, and the rotation rate of the spindle motor 15 is increased to a predetermined rotation rate (step S14). After being given an await order (Wait) for 20 ms (step S16), brake pulses are supplied every 10 ms until the rotation of the spindle motor 15 stops (steps S18 to S26). The number of times the brake pulses are supplied is counted (steps S12 and S28). Based on the number of times counted, it is judged whether or not the optical disk is mounted on the disk tray (S30 to S36).

When the count is 2 times or less, it is judged that the optical disk is not mounted (absence of the optical disk) on the disk tray. When the count is between or equal to 3 times and 20 times, it is judged that the optical memory disk is mounted (presence of the optical disk) on the disk tray. When the count is 21 times or larger, it is judged that the spindle motor 15 is out of working order. Based on these judgments, when the optical disk is not mounted or when the spindle motor 15 is out of working order, such information is displayed for the user. Further, when the optical disk is mounted, the information recorded on the optical disk is read and reproduced.

Alternatively, as a modification of the above embodiment, the construction may be such that there are provided threshold values separately for the counter n which discriminate the number of times the brake pulse are supplied necessary to stop an optical disk whose diameter is 8 cm and the number of times the brake pulses are supplied necessary to stop an optical disk whose diameter is 12 cm, making it possible to distinguish the optical disk whose diameter is 8 cm from the optical disk whose diameter is 12 cm based on the number of times the brake pulses are supplied necessary to stop the rotation of the spindle motor 15.

(3) Summary

In short, the comparator 61 comparing voltages at both ends of the spindle motor 15 and outputting the result is provided, and the control IC 12 judges whether or not the spindle motor 15 is rotating based on the output from the comparator 61. Based on this judgment, brake pulses are repeatedly supplied to the spindle motor 15 until the spindle motor 15 stops. When the rotation of the spindle motor 15 is suspended, based on the number of times the brake pulses are supplied until the spindle motor 15 stops, the presence or absence of an optical disk in the disk drive is determined. Thus, it becomes possible to provide a reproducing apparatus with a built-in optical disk drive which can detect the presence or absence of a disk, consuming low electricity and without incorrect detection.

Needless to say, the present invention is not limited to the above embodiment. The points described below should be apparent to those skilled in the art.

- To apply mutually replaceable members and structures disclosed in the above embodiments by altering the combination thereof as required.
- To replace, as required, the members and structures disclosed in the above embodiments with mutually replaceable members and structures which are not disclosed in the above embodiment but known in the art, and to apply them by altering the combination thereof.
- To replace, as required, the members and structures known in the art and disclosed in the above embodiments with members and structures which are not disclosed in the above embodiments but can be assumed by those skilled in the art as substitutes for the members and structures disclosed in the above embodiments based on known arts etc. and to apply them by altering the combination thereof.

The points described above are to be disclosed as one embodiment of the present invention.

While the invention has been particularly shown and described with respect to preferred embodiments thereof, it should be understood by those skilled in the art that the foregoing and other changes in form and detail may be made therein without departing from the spirit and scope of the invention as defined in the appended claims.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A reproducing apparatus with a built-in optical disk drive including a spindle motor to rotate an optical disk and an optical pickup to emit a laser beam for reproducing information recorded on the optical disk and to receive a reflected light from the optical disk, said reproducing apparatus comprising:
   a driver that outputs a drive voltage to said spindle motor;
   a comparator that compares voltages produced at both terminals of said spindle motor, outputs LOW when a voltage to rotate the spindle motor in a direction of reading the disk is inputted, outputs HIGH when a voltage of said spindle-motor brake pulse is inputted to said spindle motor, keeps outputting at the same level as the one immediately before a suspension when the input of the voltage is suspended for a predetermined time, and then outputs LOW; and
   a control integrated circuit (IC) including a counter that outputs a control signal to control the output of the drive voltage of said driver while receiving the output from said comparator at a general purpose input output (GPIO) and outputs a voltage as a base of said drive voltage to said driver,
   said control IC stops said spindle motor by controlling said driver, resets said counter, and waits a predetermined time after controlling said driver and rotating said spindle motor at a predetermined rotation rate in a positive direction;
   said control IC repeatedly supplies brake pulses to said spindle motor until said spindle motor stops;
   said control IC counts the number of times said brake pulses are supplied with said counter;
   said control IC determines that said spindle motor is stopped if it detects HIGH in a predetermined time after said brake pulses are inputted; and
   wherein, while said spindle motor is stopped, said control IC determines that an optical disk is not mounted when the value of said counter is smaller than a threshold value, determines that the optical disk is mounted when the value of said counter is equal to or larger than the threshold value and smaller than a predetermined upper-limit number of times, and determines that said spindle motor is out of working order when the counter is equal to or larger than the predetermined upper-limit number of times.

2. A reproducing apparatus with a built-in optical disk drive including a spindle motor to rotate an optical disk and an optical pickup to emit a laser beam for reproducing information recorded on the optical disk and to receive a reflected light from the optical disk, said reproducing apparatus, comprising:
   a comparator that compares voltages at both ends of said spindle motor and outputs a result;
   a rotation detector that judges whether or not said spindle motor is rotating based on the output from the comparator;
   a braking circuit that repeatedly supplies brake pulses, based on the judgment of said rotation detector, to said spindle motor until said spindle motor stops;
   a memory that stores the number of times said brake pulses are supplied until said spindle motor stops; and
   an optical disk presence-or-absence determining unit that determines the presence or absence of said optical disk based on said number of times stored in said memory.

3. A reproducing apparatus with a built-in optical disk drive according to claim 2, wherein said braking circuit increases a rotation rate of said spindle motor to a predetermined rotation rate and supplies brake pulses to said spindle motor until said spindle motor stops.

4. A reproducing apparatus with a built-in optical disk drive according to claim 3, wherein said braking circuit once stops the rotation of the spindle motor before increasing the rotation rate of said spindle motor.

5. A reproducing apparatus with a built-in optical disk drive according to claim 3, wherein, after the rotation rate of said spindle motor is increased to the predetermined rotation rate, said braking circuit waits a predetermined time and supplies said brake pulses.

6. A reproducing apparatus with a built-in optical disk drive according to claim 2, wherein said optical disk presence-or-absence determining unit determines that said optical disk is not mounted when the number of times the brake pulses are supplied is smaller than a first prescribed number of times.

7. A reproducing apparatus with a built-in optical disk drive according to claim 2, wherein said optical disk presence-or-absence determining unit determines that said optical disk is mounted when said number of times the brake pulses are supplied is equal to or larger than the prescribed number of times.

8. A reproducing apparatus with a built-in optical disk drive according to claim 2, wherein said optical disk presence-or-absence determining unit is provided with a first prescribed number of times and a second prescribed number of times which is larger than the second prescribed number of times and determines that said spindle motor is out of working order when said number of times the brake pulses are supplied is larger than the second prescribed number of times.

9. A reproducing apparatus with a built-in optical disk drive according to claim 2,
   wherein said comparator outputs LOW when a voltage to rotate said spindle motor in a direction of reading information on a disk is inputted, outputs HIGH when a voltage of said spindle-motor brake pulse is inputted to said spindle motor, and keeps outputting at the same level as the one immediately before a suspension for a predetermined time and outputs LOW when the input of voltage is stopped; and
   wherein said rotation detector judges that said spindle motor has stopped when detecting HIGH in a predetermined time after the brake pulse is inputted by said braking circuit.

10. A reproducing apparatus with a built-in optical disk drive according to claim 2,
    wherein said comparator is included in the counter-electromotive force detecting circuit;

wherein, of the two terminals to which drive voltages of said spindle motor are inputted, the voltage of the terminal to which a positive voltage is inputted when reading information recorded on the optical disk is referred to as a positive-side terminal voltage and the voltage of the terminal to which a negative voltage is inputted is referred to as a negative-side terminal voltage;

wherein the positive-side terminal voltage and the negative-side terminal voltage are inputted to said comparator and compared, and the output of the comparator is set such that the output is LOW when (Positive-side terminal voltage)−(Negative-side terminal voltage) is positive and the output is HIGH when (Positive-side terminal voltage)−(Negative-side terminal voltage) is negative; and wherein (Positive-side terminal voltage)−(Negative-side terminal voltage) shows a rotational direction of the spindle motor.

11. A reproducing apparatus with a built-in optical disk drive according to claim 2, wherein, in said rotation detector, the output of said comparator is HIGH because (Positive-side terminal voltage)−(Negative-side terminal voltage) is negative when said brake pulse is applied to said spindle motor, and it is judged that said spindle motor is rotating if the output of said comparator is LOW after said brake pulse is applied and that said spindle motor is not rotating if the output of said comparator remains HIGH after said brake pulse is applied.

12. A reproducing apparatus with a built-in optical disk drive according to claim 2, wherein there are provided threshold values separately for the number of times said brake pulses are supplied necessary to stop said optical disk whose diameter is 8 cm and the number of times said brake pulses are supplied necessary to stop said optical disk whose diameter is 12 cm, and the optical disk whose diameter is 8 cm and the optical disk whose diameter is 12 cm are distinguished by the number of times the brake pulses are supplied necessary to stop the rotation of said spindle motor.

* * * * *